Patented Sept. 29, 1942

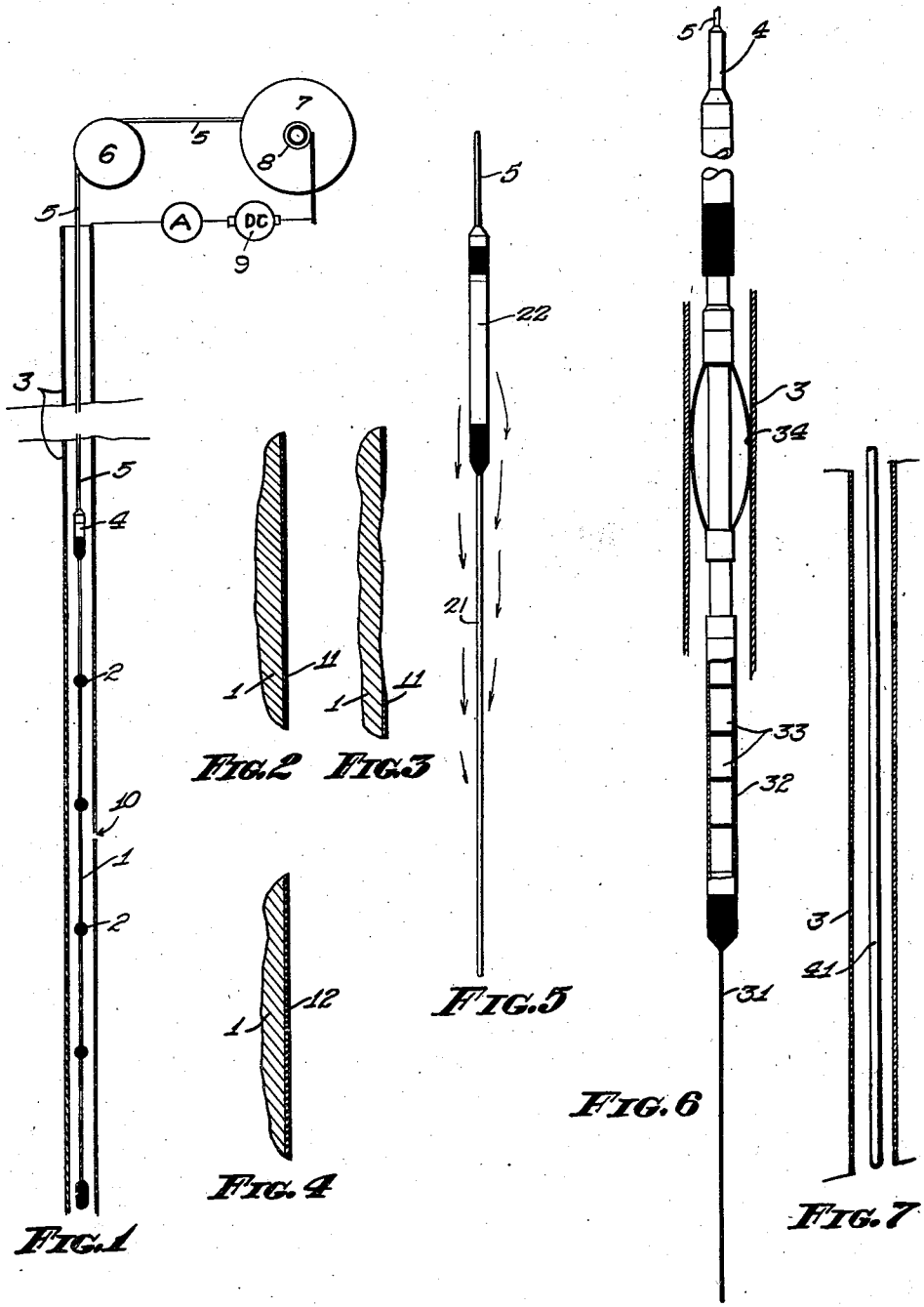

2,296,981

UNITED STATES PATENT OFFICE 2,296,981

METHOD AND APPARATUS FOR DETERMINING THE POINT OF WATER ENTRY INTO OIL WELLS

Melvin E. Chun, Huntington Park, Calif., assignor to Lane-Wells Company, Los Angeles, Calif., a corporation of Delaware Application September 24, 1940, Serial No. 358,084

8 Claims. (Cl. 175—182)

My invention relates to a method and apparatus for determining the point of water entry into an oil well, and among the objects of my invention are:

First, to provide a means and method for locating the point or points of water entry into a wellbore, which is adapted to meet the wide variety of well conditions that may exist, that is, to provide a method and apparatus of this character which may be employed in flowing wells or pumping wells within a casing or liner, or in the open portion of a well opposite the producing zone;

Second, to provide a means and method of this character which may be incorporated with the different methods now in use for preparing a well prior to determining the point of water entry, the method and apparatus herein contemplated however requiring only a minimum of preliminary preparation;

Third, to provide an apparatus of this character which dispenses with surface recording apparatus such as used in the present conventional systems of water locating, but which produces a permanent record of the area under investigation;

Fourth, to provide a method and apparatus of this character which utilizes the electrolysis or other chemical or electrochemical effect on a testing element positioned within a wellbore and continuing throughout the section under investigation, the testing element itself serving as a record of the well condition;

Fifth, to provide an apparatus of this character which, by reason of the fact that the testing element itself serves as the record, produces a full scale record from which the point or points of water entry may be determined with accuracy;

Sixth, to provide an apparatus of this character which may be operated as a self-contained unit and either suspended or dropped in the wellbore and left there during the testing period, or may be operatively connected through a conductor cable to a source of electrical energy at the well mouth; and Seventh, to provide an apparatus and method of this character which is particularly simple of construction and operation.

With the above and other objects in view, as may appear hereinafter, reference is directed to the accompanying drawing, in which:

Figure 1 is a diagrammatical view of my apparatus in its one form, wherein a conductor cable and a source of electrical energy positioned at the well-mouth is used;

Figure 2 is a fragmentary, longitudinal sectional view of the testing element, showing a surface plating thereon before the element is subjected to the well conditions;

Figure 3 is a similar sectional view showing the element after being affected by the flow of current;

Figure 4 is a sectional view similar to Figure 2, showing a coating of porous insulation material;

Figure 5 is a diagrammatical view of a modified arrangement wherein two dissimilar metals are used, the metal of one plating on the metal of the other in accordance with the distribution of the electrolyte;

Figure 6 is a fragmentary, diagrammatical view of a modified form of my apparatus which is self-contained, that is, the source of electrical energy is housed in proximity to the testing element and the device lowered on a sand line or other suitable means; and Figure 7 is a further modified form in which no external source of electrical energy is provided.

Reference is first directed to Figures 1, 2 and 3: The determination of the point of water entry is usually desired in cased holes, the object being to locate breaks in the casing through which contaminating water may be entering, or, in some instances, water location is carried on in the open hole, particularly in the producing zone, to determine the water-oil contact level.

My apparatus consists essentially of a testing element 1 which may be in the form of a metal rod or wire, preferably of copper or other highly conductive metal. Suitable means, such as insulators 2, are provided at intervals along the testing element to space the testing element from the well casing designated 3. The upper end of the testing element 1 is connected to a cable head 4 which, in turn, is secured to a conductor cable 5 extending to the mouth of the well and over a sheave 6 to a hoisting drum 7. A slip ring 8 is provided so that the conductor of the cable may be connected to a direct current source such as a D. C. generator or a battery 9, the other side of which is connected to the casing 3 or to the sheath of the cable 4, or both. In this connection, it should be noted that the conductor cable may be in the form of a hoisting or haulage wire rope with a single conductor core.

Operation of the apparatus shown in Figure 1 is as follows: The testing element has sufficient length to embrace the section of the wellbore under investigation. The testing element forms an anode of an electrolytic circuit, sufficient current being supplied from the battery 9, or other source of electrical energy. Assuming that salt water is entering at the break in the casing indicated by 10 in Figure 1, there will be a greater electrolytic action on the testing element or anode at this point. Consequently, after a period of time the testing element may be removed and examined to determine the point or points at which the electrolysis is most apparent. Thus, if the depth at which the testing element was suspended is known the point of water entry may be determined with accuracy. The testing element may be formed of any of the metals, such as aluminum, iron, zinc, lead, copper, gold, silver, or various alloys.

If desired, the testing element may be plated with a contrasting metal; for example, the testing element may be copper plated with silver. Preferably the plating is extremely light so that only a small amount of silver need be removed from the testing element to give a visual indication by reason of the difference in color at the point of water entry, as shown in Figures 2 and 3, in which 1 represents the testing element and 11 the plated metal.

It is also feasible, as shown in Figure 4, to coat the testing element. Thus, in Figure 4 the testing element is shown coated with a porous insulation material 12. The insulation material may serve in place of the spacers 3 in Figure 1, in which case the coating may be relatively thick, but need not be permanently attached to the element, or the porous coating 12 may be relatively thin. If a thin coating is provided, the effect of electrolytic action to destroy the bond between the coating and the testing element is such that the electrolytic action on the testing element is readily apparent.

While it is preferable that the testing element be the anode of the electrical circuit so that the metal moves from the testing element in the course of operation, it is possible to utilize the testing element as the cathode, as shown in Figure 5. In this case a cathode 21 and an anode 22 are suspended from a cable, the cathode extending throughout the area to be investigated. The well is treated with a solution containing a salt of the metal comprising the cathode, the solution continuing to a point above the anode so that the cathode will be plated by material from the anode, the amount of plating at any one point being indicative of the condition of the fluid in the well; for example, at the point where oil is entering the electrolytic action is inhibited, whereas at the point or the region containing the electrolyte the plating action is allowed to take place.

Reference is now directed to Figure 6: The construction here shown comprises an anode 31 similar to the anode 1, one end of which is secured to a case 32 containing batteries or other potential source 33. One side of the batteries is electrically connected with the anode while the other side is connected to a bow spring cage 34 adapted to engage the well casing. The circuit is such that the well casing forms the cathode and the testing element 31 the anode. The apparatus thus described may be lowered into the wellbore on a wire rope or on tubing and, if desired, left for a period of time and retrieved in the usual manner.

Operation of the apparatus disclosed in Figure 6 is substantially the same as that shown in Figure 1, the essential difference being that it is self-contained and does not need connection with surface equipment. The apparatus may be so designed that when the batteries have spent their energy, sufficient electrochemical action has taken place to produce a record.

Reference is now directed to Figure 7: A metal above iron in electromotive series may be used as a testing element. This is indicated by 41 in Figure 7. If this is done, wherever an electrolyte exists in the well a battery element will be formed comprising the testing element and the casing. Thus the testing element need not be provided with an external source of electrical energy. The testing element 41 may be provided with the plated surface shown in Figures 2 and 3, or the porous insulation covering shown in Figure 4, or suitable spacers such as shown in Figure 1 may be used to space the anode from the casing.

If the test is to be made in open-hole below the casing, the casing or the cable above the anode still serves as the return side of the circuit.

Various changes and alternate arrangements may be made within the scope of the appended claims, in which it is my intention to claim all novety inherent in the invention as broadly as the prior art permits.

I claim:

1. A method of determining the point of water entry into a wellbore, characterized by: positioning a testing element in the wellbore which element extends throughout the region to be tested; leaving the testing element in place for a period calculated to permit detectable chemical action on said testing element; removing said testing element; and examining said testing element for variations in chemical action thereon.

2. A method of determining the point of water entry into a wellbore, characterized by: positioning at a known depth in a wellbore a testing element which element extends throughout the region to be investigated; establishing an electric circuit, including said testing element and the liquid contained in the wellbore, to cause electrochemical action on said testing element; removing said testing element; and investigating the extent of electrochemical action which may have occurred on said testing element.

3. A method of determining the location of water in an oil well, characterized by: extending throughout the region to be investigated a testing element tending to react chemically with the different liquids encountered in said region; removing said testing element after a predetermined period; and investigating the extent and location of chemical reaction which may have occurred on said testing element.

4. A method of determining the location of water in an oil well, characterized by: positioning in a wellbore an anode of sufficient length to embrace the region to be investigated; connecting said anode in an electric circuit to cause electrochemical reaction between said anode and any electrolyte present in said region; removing said anode after a predetermined time; and investigating said anode for evidences of electrochemical action.

5. An apparatus for detecting the point of water entry into a wellbore, comprising: an elongated testing element extending throughout the region of the wellbore to be investigated, said element including a core of one metal and a plating of different metal; and an electrical circuit incorporating said testing element and its coating as an anode and any electrolyte present in said region, whereby detectable electrochemical reaction occurs on said testing element in the presence of said electrolyte.

6. An apparatus for detecting the point of water entry into a wellbore, comprising: an elongated testing element adapted to form an anode in an electrical circuit and extending throughout the region to be investigated, said element having a coating adapted to render readily detectable any electrochemical action on said element; and an electrical circuit including said element and any electrolyte present in said region.

7. An apparatus for detecting the point of entry of water into a wellbore, comprising: a conductor cable; an elongated anode adapted to be suspended from the cable within a wellbore and extend throughout the section of the wellbore under investigation; a source of electrical energy connected through said cable to said anode, the other side of said source being grounded; and the circuit being completed through any electrolyte that may be present in said section of the wellbore; said anode adapted to react chemically with the electrolyte to change its surface characteristics at those portions contacted by the electrolyte, whereby when said anode is withdrawn a visual indication of such chemical reaction appears thereon.

8. An apparatus for detecting the point of entry of water into a wellbore, comprising: an elongated anode adapted to extend throughout the section of a wellbore under investigation; a battery case associated with said anode; batteries in said case, one side of said batteries being grounded and the other side of said batteries being connected with said anode; said anode adapted to react chemically with any electrolyte present in the well bore to form on its surface a visual record of the location of the electrolyte.

MELVIN E. CHUN.